United States Patent [19]

McAskill

[11] Patent Number: 5,025,674
[45] Date of Patent: Jun. 25, 1991

[54] SIXTEEN SPEED POWERSHIFT TRANSMISSION

[75] Inventor: John P. McAskill, Coffeyville, Kans.
[73] Assignee: Deere & Company, Moline, Ill.
[21] Appl. No.: 486,582
[22] Filed: Feb. 28, 1990
[51] Int. Cl.$^5$ .............................................. F16H 3/06
[52] U.S. Cl. ........................................ 74/360; 74/359
[58] Field of Search ................................. 74/359, 360

[56] References Cited

U.S. PATENT DOCUMENTS

| | | | |
|---|---|---|---|
| 2,867,126 | 1/1959 | Bolster | 74/360 |
| 2,972,901 | 2/1961 | Gerst | 74/360 |
| 3,273,415 | 9/1966 | Frost | 74/360 |
| 3,344,679 | 10/1967 | Zeller | 74/360 |
| 3,350,951 | 11/1967 | Frost et al. | 74/360 |

Primary Examiner—Dirk Wright

[57] ABSTRACT

A 16-speed drop box transmission is provided in a particularly compact double-diamond arrangement. Most of the shafts in the transmission, as well as many of the gears and clutches, are identical and interchangeable. This significantly reduces the number of different parts needed to make the transmission. Most of the gears which do the actual power modification to produce the various gear ratios are rotatably mounted about these interchangeable shafts. The basic design is highly flexible, since different gears may easily be substituted for one or more of these rotatably mounted gears to produce a transmission with different gear ratios.

12 Claims, 4 Drawing Sheets

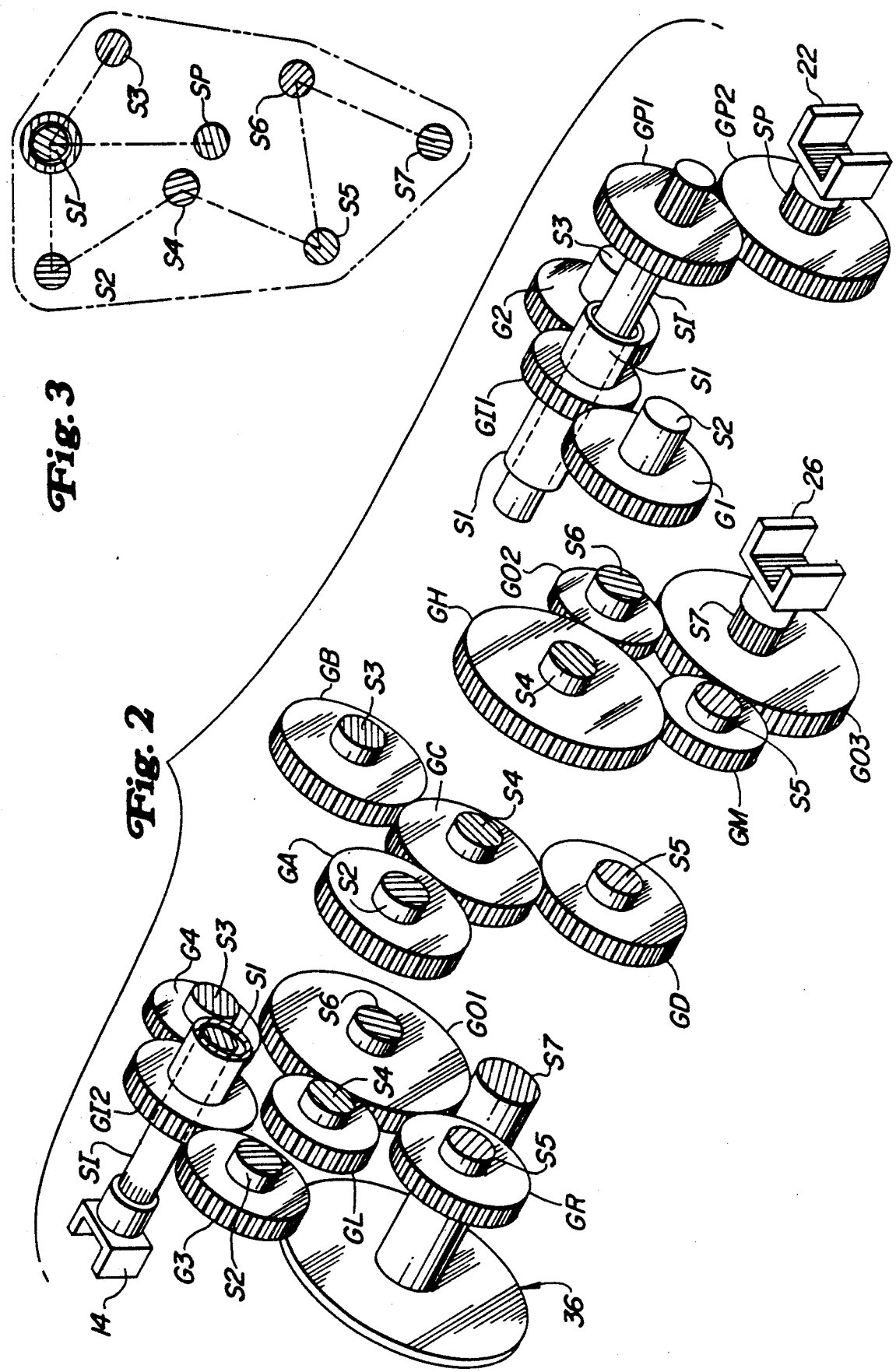

SIXTEEN SPEED POWERSHIFT TRANSMISSION

BACKGROUND OF THE INVENTION

1. Field of the Invention

The present invention relates to power shift transmissions, and in particular to large heavy duty transmissions for use in work vehicles.

2. Description of the Related Art

Heavy duty work vehicles, such as tractors, industrial equipment, combines and the like, generally require transmissions that have a wide range of available speeds. It is quite common with these vehicles to set the throttle to run the engine at a fixed number of revolutions per minute, with ground speed then being adjusted by changing the gear ratios in the transmission, rather than changing the amount of fuel provided to the engine.

Providing such a large number of gear ratios typically results in a physically large transmission with a correspondingly large number of parts. However, to reduce the cost of the transmission, it is desirable to reduce the size of the transmission as much as possible, thereby reducing the amount of materials used. Similarly, it is desirable to reduce the number of different parts as far as possible, thereby reducing the manufacturing costs.

SUMMARY OF THE INVENTION

It is an object of the present invention to provide a transmission having a large range of transmission ratios in a relatively compact volume. It is a further object of the present invention to provide a transmission having a minimum number of different parts, thereby reducing the cost to make each part. Finally, it is an object of the present invention to provide a transmission design which is easily modified to substitute different gears to create a transmission with different gear ratios.

These and other objects are achieved according to the present invention in a transmission having seven shafts. The various shafts are arranged in a double diamond. The first shaft forms the top apex of one diamond, and carries two gears. The next two shafts are positioned to form the two side vertices of a diamond, and each carry three gears. One of the gears on each of the second and third shafts is fixed for rotation with the shaft, while the other two gears are rotatably mounted to the shaft and mesh with the two gears on the first shaft. A fourth shaft is positioned as the base vertex of this diamond, and the top vertex of the second diamond. This fourth shaft also carries three gears, one fixed for rotation with the shaft and two rotatable about the shaft. The fixed gears of the second and third shafts mesh with the fixed gear of the fourth shaft, so that force transmitted to either of the second and third shafts will be transmitted to the fourth shaft.

A fifth and a sixth shaft form the side vertices of the second diamond. The fifth shaft again carries three gears, one fixed to rotate with the shaft and two rotatably mounted to the shaft, with the fixed gear meshing with the fixed gear of the fourth shaft. The sixth shaft may be similar to the first second, third, fourth and fifth shafts, including having three gears, but in the preferred embodiment it carries just two fixed gears. One of these fixed gears meshes with the single gear on the seventh shaft, which is positioned as the bottom vertex of the lower diamond, and with one of the rotatable gears on the fourth shaft. The other gear on the sixth shaft meshes with one of the rotatable gears on each of the fourth and fifth shafts.

Each of the rotatable gears on the shafts is selectively clutchable to the shaft on which it rotates.

The second, third, fourth and fifth shafts preferably have identical shafts, identical fixed gears, identical clutches, identical bearings and the like. This considerably reduces the total number of different parts required for the transmission. This also provides a design which is highly flexible, since different rotatable gears can be mounted added to the different shafts as desired, with a different rotatable gear substituted as needed to provide a different gear ratio. A variety of lock-ring grooves preferably is provided on each shaft to provide easy positioning of such a variety of gears.

Preferably, the first shaft is hollow, and has a central input shaft with a direct link-up to the vehicle prime mover, e.g., an engine, with a master clutch provided to selectively connect the first shaft to the input shaft. A gear is mounted at one end of the input shaft, and meshes with another gear mounted to a power take-off (PTO) shaft to drive a PTO coupling. Similarly, a charge pump to provide pressurized hydraulic fluid for control of the transmission preferably is driven directly off of the input shaft.

BRIEF DESCRIPTION OF THE DRAWINGS

The present invention will be described with reference to the following drawings:

FIG. 2 is an exploded isometric schematic representation of the gears and shafts of the transmission of FIG. 1.

FIG. 3 is a cross-sectional schematic view of the arrangement of the shafts in FIG. 1. The dashed lines in FIG. 3 indicate the approximate lines through which the cross-section of FIG. 1 was taken.

DETAILED DESCRIPTION OF THE PREFERRED EMBODIMENTS

Figure 1A:
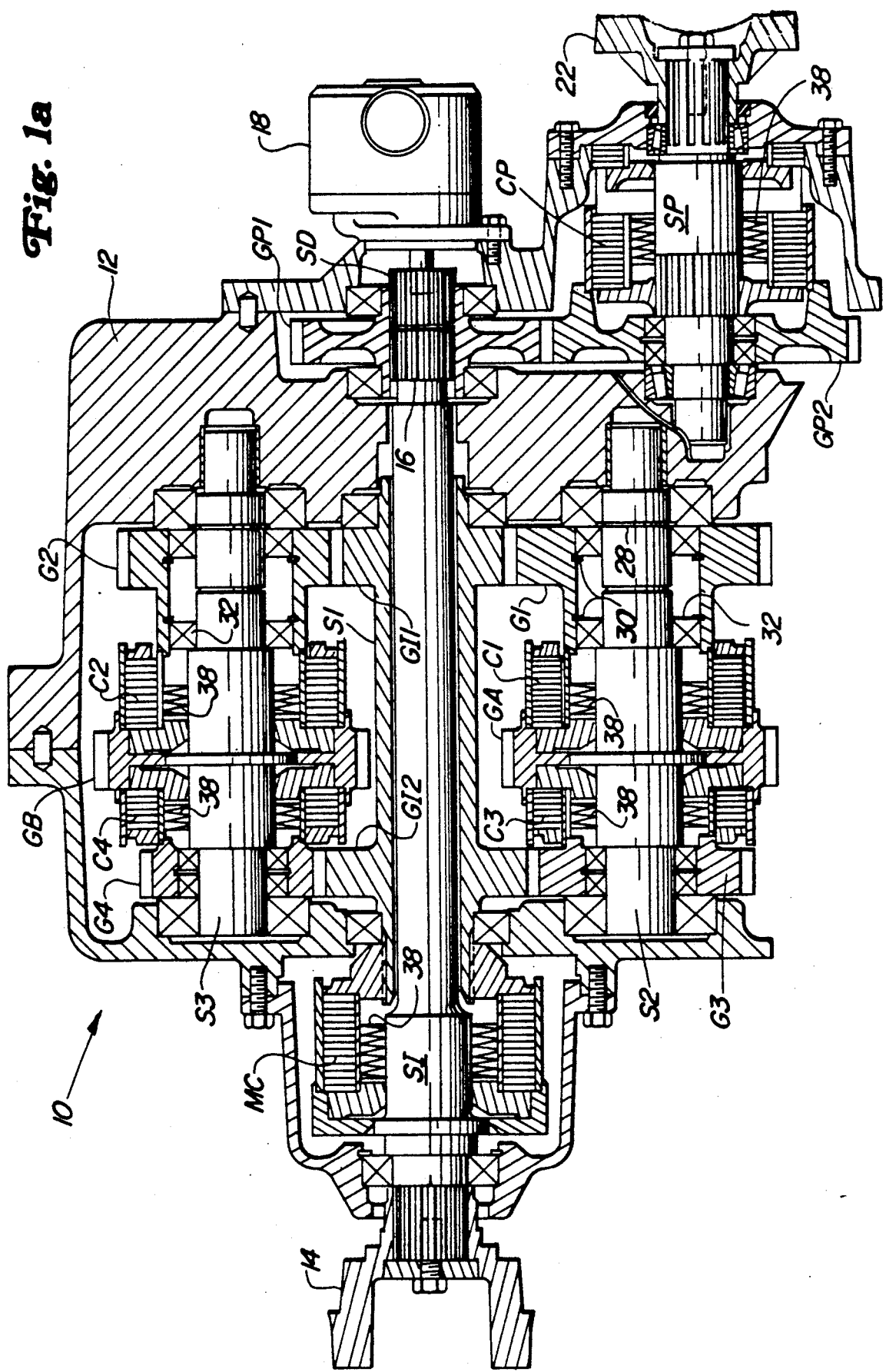
FIGS. 1a-1c can be assembled to form a cross-sectional view (hereinafter collectively referred to as FIG. 1) of a transmission according to the present invention.

For convenience, in the following description the reference numerals for gears normally will begin with a G, the reference numerals for clutches will begin with a C (with the exception of the master clutch MC), and the reference numerals for shafts will begin with an S.

Figure 1B:
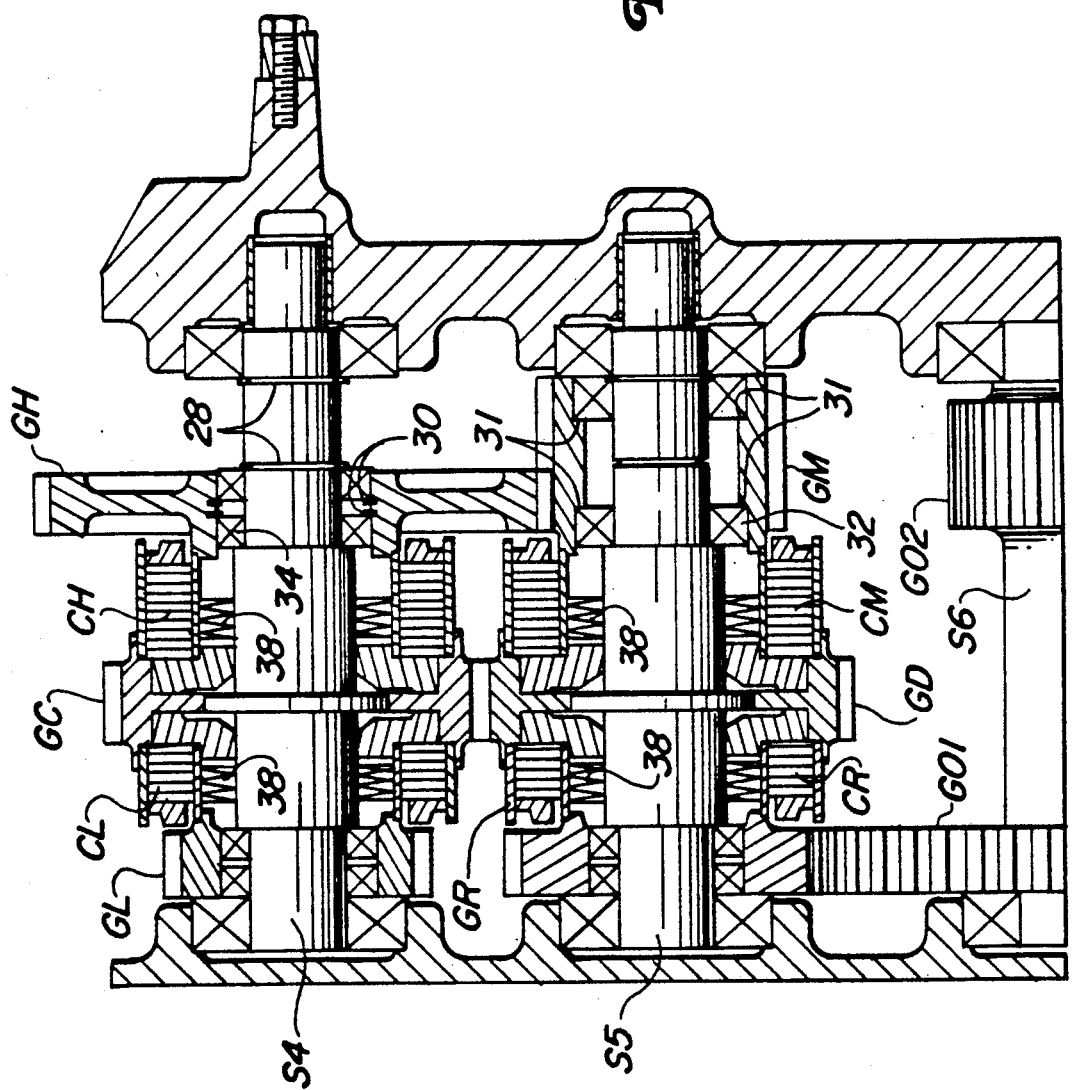
Figure 1C:
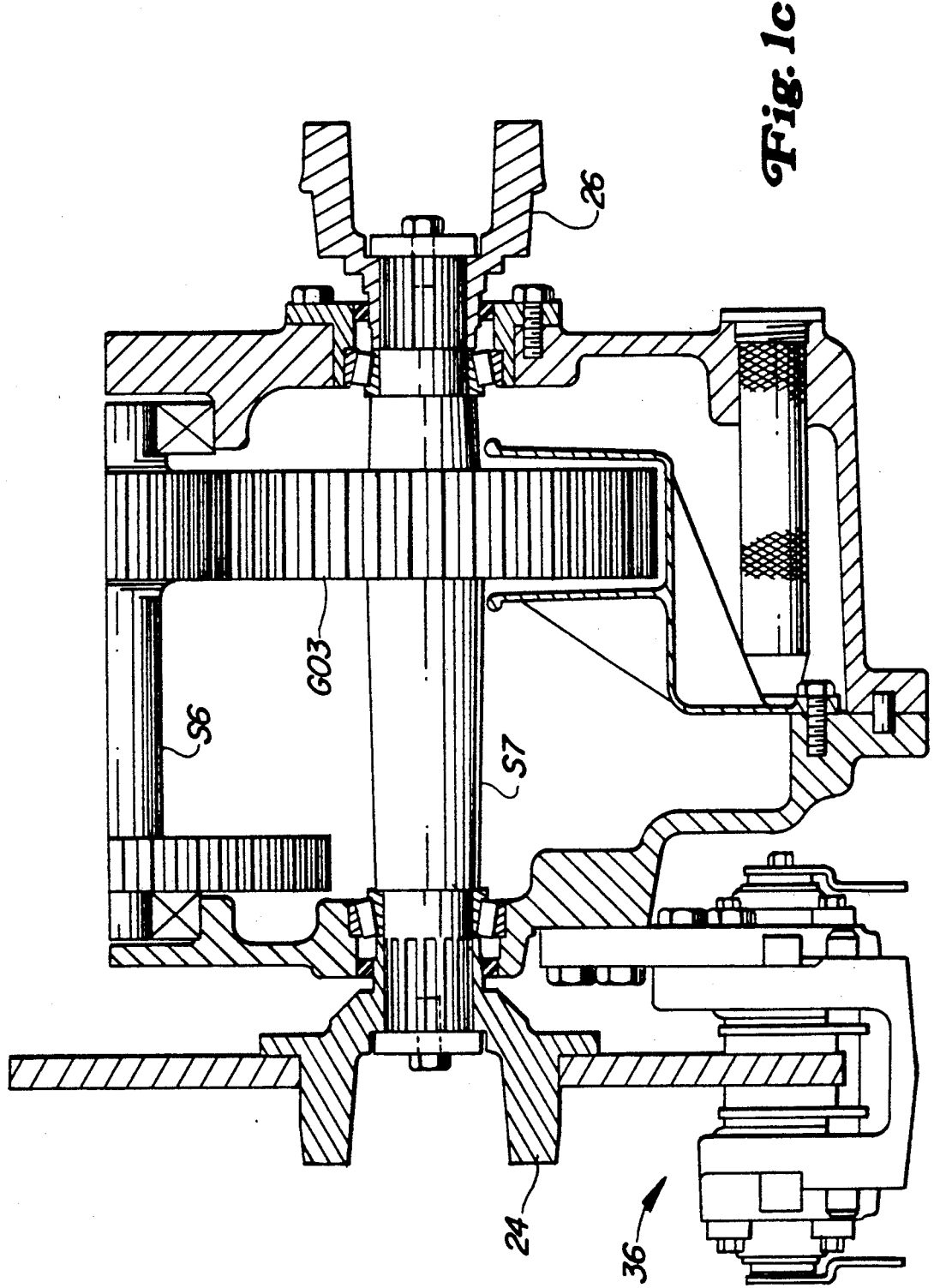

Referring to FIG. 1, a transmission 10 is largely contained in a transmission housing 12. An input coupler 14 is connected to one end of an input shaft SI, which is rotatably mounted in the housing 12. The input coupler 14 is driven by a prime mover, e.g., an engine, not shown. The opposite end 16 of the input shaft SI is splined.

A charge pump 18 is mounted to the housing 12 with its drive shaft SD aligned with and adjacent to the splined end 16 of input shaft SI. The drive shaft SD is splined to match the splines on the end 16. The charge pump 18 provides pressurized hydraulic fluid to operate the control system for the various clutches to be described below. Fluid is supplied to these clutches in the usual manner, which is well known to one of ordinary skill in the art and therefore will not be described further herein.

First power take-off (hereinafter PTO) gear GP1 is rotatably mounted in the housing 12 around the end 16 of input shaft SI and drive shaft SD. The inner surface of gear GP1 is splined, and meshes with the splines on both the end 16 and the drive shaft SD, thereby ensuring that the input shaft SI, the gear GP1 and the drive shaft SD are fixed for rotation together.

PTO shaft SP is rotatably mounted to housing 12 adjacent to the input shaft SI, as best seen in FIGS. 1 and 3. The second PTO gear GP2 is rotatably mounted around the PTO shaft SP and meshes with the first PTO gear GP1. PTO clutch CP is provided to selectively connect the second PTO gear GP2 for rotation with the PTO shaft SP, thereby providing power to the PTO coupler 22.

Turning to the main body of the transmission, the first shaft S1 of the main transmission is a hollow sleeve which is rotatably mounted in the housing 12 around the input shaft SI. A master clutch MC is provided to selectively connect the first shaft S1 for rotation with the input shaft SI, thereby providing driving power to the transmission. The first shaft S1 carries two gears GI1, GI2 which are fixed for rotation with the first shaft S1.

Second shaft S2 (which appears in FIG. 1 to be below the first shaft S1) is rotatably mounted in the housing 12 adjacent to the first shaft S1. Gear GA is fixed for rotation with shaft S2. Gears G1, G3 are rotatably mounted to the shaft S2. Clutches C1, C3 also are mounted around shaft S2 and can selectively connect gears G1, G3, respectively, for rotation with gear GA and shaft S2. Gear G1 meshes with gear GI1, while G3 meshes with gear GI2, as best seen in FIG. 2.

Third shaft S3 also is rotatably mounted in the housing 12 adjacent to the first shaft S1, and carries gear GB fixed for rotation with shaft S3. Gears G2, G4 are rotatably mounted about the third shaft S3. Clutches C2, C4 also are positioned about the third shaft S3 and can selectively connect gears G2, G4, respectively, for rotation with gear GB and third shaft S3. Gear G2 meshes with gear GI1, while gear G4 meshes with gear GI2, as best seen in FIG. 2.

Fourth shaft S4 is positioned adjacent to second and third shafts S2, S3, with shafts S1, S2, S3 and S4 forming the four vertices of a slightly compressed diamond, as best seen in FIG. 3. Shaft S4 is rotatably mounted in the housing 12, and carries gear GC fixed for rotation with shaft S4. Gears GL, GH are rotatably mounted to the fourth shaft S4. Clutches CL, CH also are positioned about shaft S4, and can selectively connect gears GL, GH, respectively, for rotation with gear GC and shaft S4. Gear GC meshes with gears GA, GB, as best seen in FIG. 2.

Fifth shaft S5 is positioned adjacent to fourth shaft S4, as best seen in FIG. 3. Fifth shaft S5 is rotatably mounted in housing 12, and carries gear GD fixed for rotation with shaft S5. Gears GR, GM are rotatably mounted to the fifth shaft S5. Clutches CR, CM also are positioned about shaft S5, and can selectively connect gears GR, GM, respectively, for rotation with gear GD and shaft S5. Gear GD meshes with gear GC, and gear GM meshes with gear GH, as best seen in FIG. 2.

Sixth shaft S6 also is positioned adjacent to and below fourth shaft S4, as best seen in FIG. 3. Sixth shaft S6 is rotatably mounted in housing 12, and carries gears GO1, GO2, which are fixed for rotation with shaft S6. Gear GO1 meshes with gears GL and GR, as best seen in FIG. 2. Gear GO2 meshes with GH, also as best seen in FIG. 2.

Finally, a seventh shaft S7 serves as the output shaft, and is positioned adjacent to and below shafts S5, S6, with shafts S4, S5, S6 and S7 forming the vertices of a second diamond, as best seen in FIG. 3. Shaft S7 is rotatably mounted in housing 12, and carries gear GO3, which is fixed for rotation with shaft S7. Gear GO3 meshes with gears GM, GO2, as best seen in FIG. 2. Output couplers 24, 26 are provided at either end of shaft S7, e.g., for connection to drive lines for wheels on a vehicle, not shown.

In one preferred embodiment, the gears have the number of teeth on each gear shown in Table 1:

TABLE 1

| Gear | Tooth count | Gear | Tooth count |
|------|-------------|------|-------------|
| GI1  | 40          | GA   | 60          |
| GI2  | 49          | GB   | 60          |
| G1   | 59          | GC   | 60          |
| G2   | 49          | GD   | 60          |
| G3   | 49          | GO1  | 82          |
| G4   | 40          | GO2  | 35          |
| GL   | 41          | GO3  | 86          |
| GM   | 38          | GP1  | 58          |
| GH   | 83          | GP2  | 71          |
| GR   | 50          |      |             |

Other gear tooth counts may be used to produce different gear ratios, if desired.

Upon careful review of FIG. 1, it will be apparent that shafts S2, S3, S4 and S5 are identical. Similarly, gears GA, GB, GC, GD are identical; clutches C1, C2, CH and CM are identical, and clutches C3, C4, CL and CR are identical. This interchangability of parts significantly reduces the number of different parts required to make the transmission, allowing considerable improvement in manufacturing efficiency. It also makes the basic transmission design quite flexible, since the gear ratios provided by the transmission can easily be modified simply by substituting slightly different sized gears for one or more of gears G1, G2, G3, G4, GL, GM, GH and GR.

Lock-ring grooves 28 preferably are provided on the shaft used for shafts S2, S3, S4, S5. These lock-ring grooves 28 can be used in combination with differently positioned lock-ring grooves 30 or shoulders 31 on the various gears G1, G2, G3, G4, GL, GM, GH, GR, to position the bearings 32, 34 at different positions along the shafts. In some shaft uses, e.g., on shaft S2, one or more of these lock-ring grooves 28 will be unused, but they will be used in other positions, e.g., on shaft S4. Due to the relatively low cost of machining a simple lock-ring groove, it generally is preferable to machine such grooves on all shafts made, so that any shaft can be used in any position.

To further reduce the number of parts required, preferably the same bearings also are used from one shaft to the next as much as possible, e.g., identical bearings 32 are found on shafts S2, S3, S5.

Finally, a disk brake 36 preferably is connected to one end of shaft S7, e.g., via the output coupler 24, to allow centralized braking of the entire transmission, and the clutches MC, C1, C2, C3, C4, CL, CM, CH, CR, CP preferably are provided with springs 38 to bias them out of engagement.

OPERATION

The main part of the transmission according to the present invention is basically a four-range, four-speed transmission. To transmit power through the transmission, the master clutch MC, one of clutches C1, C2, C3, C4, and one of clutches CL, CM, CH, CR must be engaged. Clutches CL, CM, CH, CR select the range (low, medium, high, reverse), while clutches C1, C2, C3, C4 select the speed (1, 2, 3, 4) within the range.

With gears having the tooth counts shown in Table 1, the transmission will provide the gear reduction ratios indicated in Table 2 when the indicated clutches are activated:

TABLE 2

| GEAR | 1 | 2 | 3 | 4 | L | M | H | R | RATIO |
|------|---|---|---|---|---|---|---|---|-------|
| F1   | X |   |   |   | X |   |   |   | 7.25  |
| F2   |   | X |   |   | X |   |   |   | 6.02  |
| F3   |   |   | X |   | X |   |   |   | 4.91  |
| F4   |   |   |   | X | X |   |   |   | 4.01  |
| F5   | X |   |   |   |   | X |   |   | 3.34  |
| F6   |   | X |   |   |   | X |   |   | 2.77  |
| F7   |   |   | X |   |   | X |   |   | 2.26  |
| F8   |   |   |   | X |   | X |   |   | 1.85  |
| F9   | X |   |   |   |   |   | X |   | 1.53  |
| F10  |   | X |   |   |   |   | X |   | 1.27  |
| F11  |   |   | X |   |   |   | X |   | 1.04  |
| F12  |   |   |   | X |   |   | X |   | 0.846 |
| R1   | X |   |   |   |   |   |   | X | 5.94  |
| R2   |   | X |   |   |   |   |   | X | 4.94  |
| R3   |   |   | X |   |   |   |   | X | 4.03  |
| R4   |   |   |   | X |   |   |   | X | 3.29  |

A number of modifications can be made to the invention described. For example, different gears could be substituted for one or more of gears G1, G2, G3, G4, GL, GM, GH, GR to provide different gear ratios. In addition, a shaft similar to the shaft used for shafts S2, S3, S4, S5 could be substituted for shaft S6, with appropriate gears added to the outside thereof. Also, lock-ring grooves 28 have been shown only on the right side of the shaft used for shafts S2, S3, S4, S5. Grooves could also be provided on the left side.

Accordingly, while the invention has been described in conjunction with a specific embodiment, it is to be understood that many alternatives, modifications and variations will be apparent to those skilled in the art in light of the aforegoing description. This invention is intended to embrace all such alternatives, modifications and variations which fall within the spirit and scope of the appended claims.

I claim:

1. A transmission comprising:
  a. a transmission housing;
  b. a first shaft rotatably mounted in said housing and having first and second gears fixed for rotation therewith;
  c. a second shaft rotatably mounted in said housing and having a third gear fixed for rotation therewith and fourth and fifth gears rotatably mounted thereto, said fourth and fifth gears meshing with said first and second gears, respectively;
  d. first and second clutch means for selectively fixing said fourth and fifth gears, respectively, for rotation with said second shaft;
  e. a third shaft rotatably mounted in said housing and having a sixth gear fixed for rotation therewith and seventh and eighth gears rotatably mounted thereto, said seventh and eighth gears meshing with said first and second gears, respectively;
  f. third and fourth clutch means for selectively fixing said seventh and eighth gears, respectively, for rotation with said third shaft;
  g. a fourth shaft rotatably mounted in said housing and having a ninth gear fixed for rotation therewith and tenth and eleventh gears rotatably mounted thereto, said ninth gear meshing with said third and sixth gears;
  h. fifth and sixth clutch means for selectively fixing said tenth and eleventh gears, respectively, for rotation with said fourth shaft;
  i. a fifth shaft rotatably mounted in said housing and having a twelfth gear fixed for rotation therewith and thirteenth and fourteenth gears rotatably mounted thereto, said twelfth gear meshing with said ninth gear and said fourteenth gear meshing with said eleventh gear;
  j. seventh and eighth clutch means for selectively fixing said thirteenth and fourteenth gears, respectively, for rotation with said fifth shaft;
  k. a sixth shaft rotatably mounted in said housing and having fifteenth and sixteenth gears fixed for rotation therewith, said fifteenth gear meshing with said tenth and thirteenth gears and said sixteenth gear meshing with said eleventh gear; and
  l. a seventh shaft rotatably mounted in said housing and having a seventeenth gear fixed for rotation therewith, said seventeenth gear meshing with said fourteenth and sixteenth gears.

2. The transmission of claim 1, wherein said first shaft is hollow and said transmission further comprises:
  a. an input shaft rotatably mounted within said first shaft and having an eighteenth gear fixed for rotation therewith;
  b. a power take-off shaft rotatably mounted in said housing and having a nineteenth gear rotatably mounted thereto, said nineteenth gear meshing with said eighteenth gear; and
  c. ninth clutch means for selectively fixing said nineteenth gear for rotation with said power take-off shaft.

3. The transmission of claim 2, further comprising a charge pump mounted to said housing and having a drive shaft fixed for rotation with said input shaft.

4. The transmission of claim 2, further comprising master clutch means for selectively fixing said first shaft for rotation with said input shaft.

5. The transmission of claim 1, further comprising brake means mounted to said housing for selectively braking said seventh shaft against rotation relative to said housing.

6. The transmission of claim 1, wherein each said clutch means includes spring means for biasing said clutch means out of engagement.

7. The transmission of claim 1, wherein said second, third, fourth and fifth shafts are substantially identical.

8. The transmission of claim 7, wherein said third, sixth, ninth and twelfth gears are substantially identical.

9. The transmission of claim 7, wherein said first, third, fifth and seventh clutch means are substantially identical, and wherein said second, fourth, sixth and eighth clutch means are substantially identical.

10. The transmission of claim 7, wherein each of said second, third, fourth and fifth shafts are provided with a plurality of lock-ring grooves for receiving lock rings for positioning at least said fifth, eighth, eleventh and fourteenth gears.

11. The transmission of claim 10, wherein each of said fifth, eighth, eleventh and fourteenth gears is hollow, and is provided on its interior surface with at least one lock-ring groove for receiving a lock ring for positioning said gear on its corresponding shaft.

12. The transmission of claim 1, wherein said first, second, third, fourth, fifth, sixth and seventh shafts are arranged in a double diamond configuration.

* * * * *